United States Patent [19]

Loren

[11] Patent Number: 4,643,448
[45] Date of Patent: Feb. 17, 1987

[54] ENERGY ABSORBING STEERING ASSEMBLY

[75] Inventor: Norman S. Loren, Warren, Mich.

[73] Assignee: Michael Ladney, Grosse Pte. Shores, Mich.

[21] Appl. No.: 762,674

[22] Filed: Aug. 5, 1985

[51] Int. Cl.$^4$ ............................................. B60R 21/00
[52] U.S. Cl. .................................. 280/777; 280/752; 280/784
[58] Field of Search ............... 280/801, 731, 777, 784, 280/752; 180/232

[56] References Cited

U.S. PATENT DOCUMENTS

| | | | |
|---|---|---|---|
| 3,627,373 | 12/1971 | Fox et al. | 269/195 |
| 3,633,934 | 1/1972 | Wilfert | 280/784 |
| 3,805,911 | 4/1974 | LaSalver | 180/54.1 |
| 3,827,525 | 8/1974 | Felzer | 180/232 |
| 3,881,742 | 5/1975 | Felzer | 280/784 |
| 3,888,502 | 6/1975 | Felzer | 280/784 |
| 3,980,314 | 9/1976 | Kopf | 280/777 |
| 4,427,214 | 1/1984 | Haggkvist | 280/752 |
| 4,440,434 | 4/1984 | Celli | 296/185 |

FOREIGN PATENT DOCUMENTS 1426265 2/1976 United Kingdom .

Primary Examiner—Richard A. Bertsch
Attorney, Agent, or Firm—Brooks & Kushman

[57] ABSTRACT

An energy absorbing steering assembly employs an elongate tubular adapter sleeve, including breakaway bolts and a bracket for mounting the sleeve on the underside of an instrument panel and at least one annular, radial sleeve flange extending inward from the side walls of the adapter sleeve, forming a reduction of the inner diameter of the adapter sleeve to a first preselected size, an elongate steering column slidably retained coaxially within the adapter sleeve, the steering column, including an annular, radial column flange extending outward from the side walls of the column, the flange being slightly smaller than the inner diameter of the adapter sleeve, a steering shaft mounted for rotation within the steering column, and elastically deformable plastic foam molded in situ to fill the cavities between the sleeve and the steering column.

14 Claims, 6 Drawing Figures

ENERGY ABSORBING STEERING ASSEMBLY

TECHNICAL FIELD

The present invention relates generally to energy absorbing vehicle components, and more particularly to an impact recoverable, energy absorbing steering assembly.

BACKGROUND ART

The use of energy dissipating materials, such as plastic foam, in connection with energy absorbing vehicle components is well known. For example, U.S. Pat. No. 3,888,502, issued to Felzer et al, discloses various energy absorbing vehicle components comprising a hollow elongated metal member having straight walls and a uniform cross section filled with foamed plastic material. These hollow metal components filled with foamed plastic material may be located on a vehicle where energy absorbing elements are required and provide a controlled, even plastic deformation of selected vehicle components, thereby optimizing the energy absorbed by the vehicle due to impact forces resulting from collision.

However, these energy absorbing components are, by design, destroyed to some extent as a result of collision impact forces.

Moreover, it is often difficult to alter the design of existing vehicles in order to achieve the energy absorption efficiency attained by these components.

It is therefore one object of the present invention to provide an energy absorbing steering assembly which provides controlled absorption of energy under impact conditions.

It is another object of the present invention to provide an energy absorbing steering assembly including means for reducing the "G" force loading on the driver caused by the impact force of the driver on the steering wheel during a collision.

It is another object of the present invention to provide an energy absorbing steering assembly which allows for a limited, recoverable displacement of the steering column under impact load conditions below a preselected threshold.

It is yet another object of the present invention to provide a recoverable, energy absorbing steering assembly which can be quickly and easily adapted to existing vehicle steering column designs.

DISCLOSURE OF THE INVENTION

The energy absorbing steering assembly provided by the present invention includes an elongate tubular adapter sleeve including means for mounting the adapter sleeve on the underside of the instrument panel or otherwise within the driver's compartment of a vehicle. The adapter sleeve includes at least one annular, radial sleeve flange extending inward from the side walls of the adapter sleeve, forming a reduction of the inner diameter of the adapter sleeve to a first preselected size, an elongate steering column slidably retained co-axially within the adapter sleeve, the steering column having a relatively uniform outer diameter slightly smaller than the first preselected size, and including an annular, radial column flange extending outward from the side walls of the column, the flange being slightly smaller than the inner diameter of the adapter sleeve, a steering shaft mounted for rotation within the steering column, and elastically deformable plastic foam molded to fill the cavities between the adapter sleeve and the steering column. When an axial load is imposed upon the steering column, the plastic foam is elastically deformed, thereby absorbing some or all of the energy of the impact, resulting in axial displacement of the steering column relative to the adapter sleeve.

The steering column is preferably provided with an annular breakaway flange which extends outward from the steering column a distance greater than the inner diameter of the adapter sleeve. The breakaway flange is located at a preselected distance "A" from the end of the adapter sleeve when the adapter sleeve and steering column are in their normal unstressed positions. Any displacement of the steering column beyond distance "A" would cause the breakaway flange to contact the end of the adapter sleeve, in turn causing the adapter sleeve to breakaway from its supporting structure. Thus, the degree of recoverable impact energy absorption can be controlled by varying the distance "A" between the adapter sleeve end and the breakaway flange on the steering column.

Variations in the amount of energy absorbed by the plastic foam over the displacement distance "A" are achieved by providing additional sleeve flange and column flange pairs, thereby dividing the area between the adapter sleeve and steering column into a greater number of energy absorbing cells.

Variations in the energy absorption may also be achieved by utilizing plastic foams having varying physical characteristics.

It should be noted that the energy absorbing steering assembly of the present invention can be constructed with existing steering column assemblies with minor modifications of those assemblies.

BEST MODE FOR CARRYING OUT THE INVENTION

Figure 1:
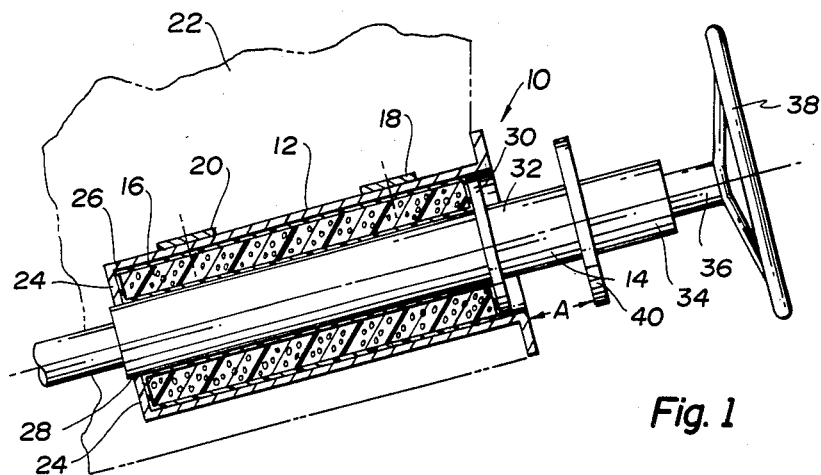
FIG. 1 is a side view, in partial cross section, of the energy absorbing steering assembly of the present invention positioned as it would be when installed in a vehicle.

Referring to FIG. 1, the energy absorbing steering column assembly 10 of the present invention includes an elongate tubular adapter sleeve 12, an elongate steering column 14 retained within the adapter sleeve 12, and a resilient energy absorbing material 16 in the cavity between the steering column 14 and the walls of the adapter sleeve 12. The adapter sleeve 12 includes mounting means 18-20 for securely attaching adapter sleeve 12 to a fixture 22, such as the underside of an instrument panel, in the driver's compartment of a vehicle. Conventional breakaway bolts and mounting brackets are employed as mounting means 18-20.

The adapter sleeve 12 also includes at least one radial sleeve flange 24 extending inward from the side walls 26 of the adapter sleeve, thereby creating an opening of reduced diameter in the adapter sleeve 12. The size of this opening 28 is sufficient to allow the steering column 14 to slide within the adapter sleeve 12 when axial impact loads are imposed upon either end of the steering column 14.

The steering column 14 includes at least one radial column flange 30 extending outward from the surface 32 of the steering column 14. This column flange 30 is slightly smaller in diameter than the inside diameter of the adapter sleeve 12. It should be noted that a conventional steering column housing 34 and steering shaft 36 mounted within the housing for rotation relative to the housing 34 may be employed in the present invention with minor alterations of these components to accommodate movement within the adapter sleeve 12. A steering wheel 38 is mounted at one end of the steering shaft 36.

The side walls of the adapter sleeve 26, the sleeve flange 24, the surface 32 of the steering column 14 and the column flange 30 define a cavity within the adapter sleeve 12. According to the present invention, a resilient, energy absorbing material 16, such as plastic foam, is injected in situ into the cavity between the adapter sleeve 12 and the steering column 14. The plastic foam used for this purpose is preferably resilient and self-skinning, such as commercially available polyurethane foams.

When a sufficiently large axial load is applied to the steering wheel 38, the energy from that axial load is transmitted from the steering column flange 30 to the plastic foam 16, with the load energy being dissipated in overcoming the compressive and shear forces exerted by the plastic foam 16 as the entire steering column 14 and column flange 30 slide forward within the adapter sleeve 12.

A breakaway flange 40 is located on the steering column housing 34 a preselected distance "A" from the end of the adapter sleeve 12. The breakaway flange 40 has a diameter greater than the opening at the end of the adapter sleeve 12 so that any axial load large enough in magnitude to displace the steering column assembly 14 through the distance "A", causes the breakaway flange 40 to contact the end of the adapter sleeve 12 preventing further displacement of the steering column 14. The excess load is transmitted directly through the walls 26 of the adapter sleeve 12 and onto the instrument panel mounts 18 to 20. Thus, axial loads less than a preselected threshold value will cause a substantially recoverable displacement of the steering column 14 within the adapter sleeve 12, while the forces from axial loads of a greater magnitude will be directed to the mounts 18-20, resulting in plastic deformation or breakaway of the steering column assembly 10 from the instrument panel 22.

It will be appreciated by those skilled in the art that the amount of energy absorption and, thus, the amount of recoverable displacement of the steering column 14 due to axial impact loads can be achieved by varying the size and number of cells, the density and resilience of the plastic foam, and the distance "A" between the end of the adapter sleeve 12 and the breakaway flange 40.

Figure 2:
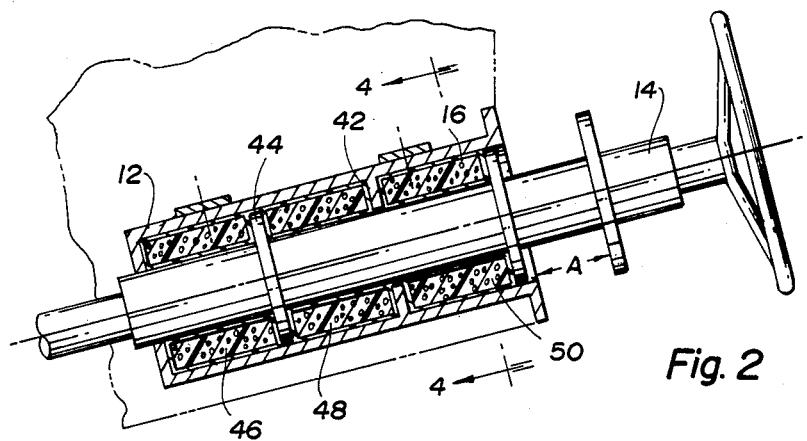
FIG. 2 is a side view, in partial cross section, of another embodiment of the present invention.
Figure 3:
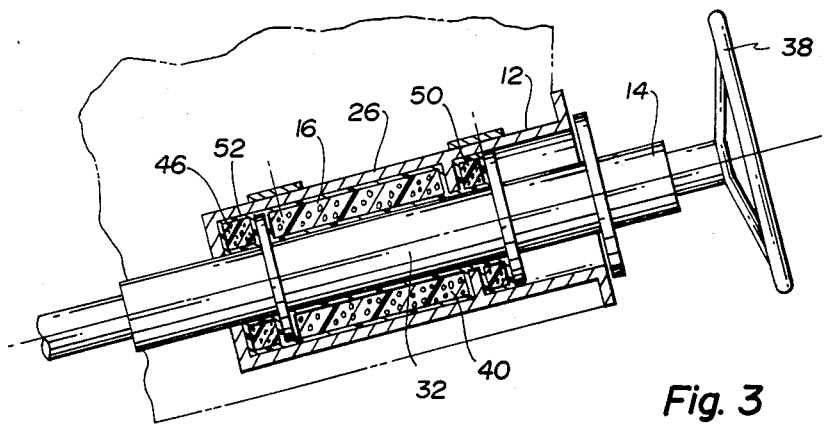
FIG. 3 is a side view, in partial cross section, of the embodiment of FIG. 2 with the steering column in a nearly fully displaced condition resulting from an axial impact load in the direction away from the steering wheel end of the steering column.

As shown in FIG. 2, a second embodiment of the present invention employs an additional adapter sleeve flange 42 and a steering column flange 44, resulting in a structure having three energy absorbing cells 46-50. The length of each of the cells 46-50 is dependent upon the desired energy absorption characteristics as well as by the physical characteristics of the plastic foam utilized. It is necessary that the preferred energy absorbing material be recoverably stretched or compressed from its relaxed length before plastic deformation occurs. Therefore, the length "L" of the cells 46-50 should be $A/\epsilon$, where A is the maximum travel distance of the steering column 14 within the adapter sleeve 12, and $\epsilon$ is the compression strain limit of the foam 16. Providing the cells 46-50 with this minimum length insures that the plastic foam 16 in each of the cells 46, 50 will undergo limited plastic deformation when they are compressed in the manner shown in FIG. 3.

When an axial impact load is imposed on the steering column 14 in a direction away from the steering wheel end of the steering column 14 and toward the end opposite the steering wheel 38, energy is also absorbed by each of cells 46 and 50 in overcoming the shear forces of the skin 52 on the outside of the plastic foam 16. This outer skin 52 is automatically formed when the foam sets after injection. The skin 52 tends to adhere to steering column surface 32 and the adjoining side walls 26 of the adapter sleeve 12 as well as the inner surfaces of the steering column flanges 30 and 42 and sleeve flanges 24 and 44. Thus, both the compressive and shear forces exerted by the energy absorbing material on the side walls 26, sleeve flanges 24 and 44, steering column flanges 30 and 42, and steering column surface 32 act to absorb the energy of an axial impact load when cells 46 and 50 are compressed.

Similarly, energy is absorbed by the plastic foam in cell 48 in overcoming both shear forces and tensile forces. Cells which undergo expansion during an energy absorbing impact must be of sufficient length in their unstressed condition to insure that the foam plastic 16 within the cell is not stretched to the point of plastic deformation when the cell is expanded. Thus, the length "L" of cell 48 should be at least $A/\sigma$, where $\sigma$ is the tension strain limit of the plastic foam 16.

An embodiment of the present invention may utilize polyurethane form having, for example, a compression strain limit, $\epsilon$, equal to 0.65 and a tension strain limit, $\sigma$ equal to 1.55. Allowing a 5% margin for error in each case, cells which undergo compression must have a length "L" equal to A/0.6, or 1.66A in order to insure that the compressed foam is not permanently deformed when the steering column 14 is moved a distance of A relative to the adapter sleeve 12. Similarly, a cell under tension must have a length "L" of at least A/1.5 or 0.66a. As will be appreciated by those skilled in the art, embodiments of the present invention which are designed to accomodate motion of the steering column 14 in either axial direction relative to the adapter sleeve 12 must have cells of a minimum length equal to the greater of the two lengths calculated above, since each of the cells will undergo both compression and tension depending on the direction of the axial impact force.

Figure 4:
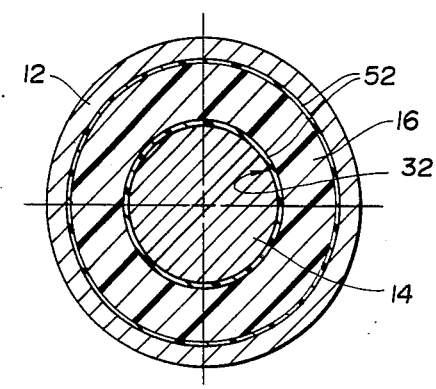
FIG. 4 is a cross sectional view along line 4—4 of FIG. 2.

As shown in FIG. 4, the skin 52 of the plastic foam 16 contacts the inner wall of the adapter sleeve 12 about its entire circumference and the outer surface 32 of the steering column 14 about its entire circumference and along substantially the entire length of the adapter sleeve 12 and steering column 14. The adherence of this skin 52 to these surfaces during curing provide substantial shear forces and absorb considerable energy during compression or expansion of the plastic foam 16 in each of the cells 46–50 in response to an axial impact load.

Figure 5:
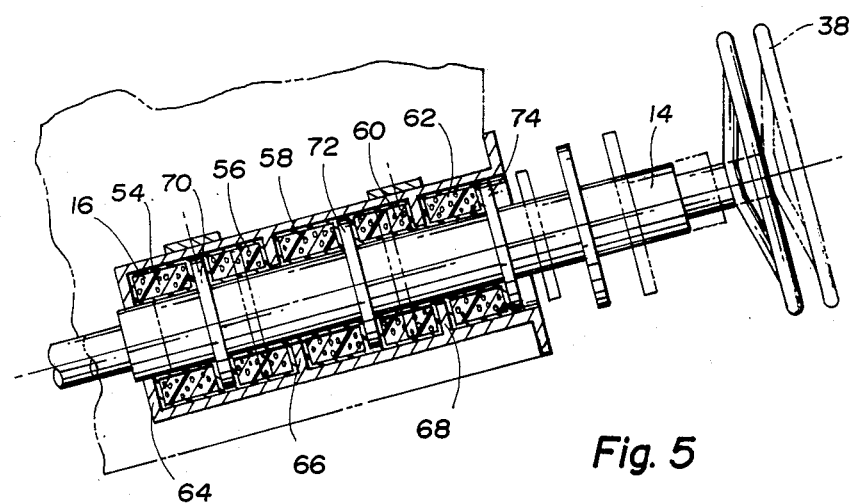
FIG. 5 is a side view in partial cross section of another embodiment of the present invention showing displacement of the steering column, in ghost lines, resulting from an axial impact load in a direction towards the steering wheel end of the steering column.
Figure 6:
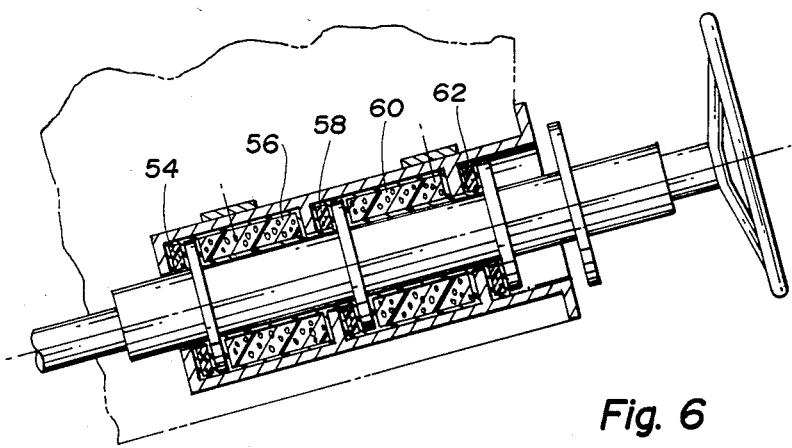
FIG. 6 is side view, in partial cross section of the embodiment shown in FIG. 5 with the steering column partially displaced as a result of axial impact loads in a direction away from the steering wheel end of the steering column.

In an alternate embodiment of the present invention shown in FIGS. 5 and 6, sleeve flanges 64–68 and steering column flanges 70–74 define five energy absorbing cells 54–62. As shown by the dotted line representation of the steering column 14, the energy from an axial impact load in the direction away from the end opposite the steering wheel and toward the steering wheel 38 is absorbed in substantially the same manner as an axial impact load in the reverse direction. In this case, the energy is dissipated in stretching the plastic foam in cells 54, 58 and 62, overcoming the tensile and shear forces of the plastic foam 16, and in compression of the plastic foam 16 and cells 56 and 60, overcoming the shear and compression forces of the plastic foam 16 in those cells.

In addition to functioning as a resilient, energy absorbing material, the plastic foam 16 aids in maintaining the axial position of the steering column 14 relative to the adapter sleeve 12 and dampens vibrations in the steering column 14 which would otherwise be transmitted to the instrument panel, thereby reducing the transmission of road noises to the driver's compartment squeaking and/or loosening of instrument panel components.

What is claimed is:

1. An energy absorbing steering assembly comprising:
    an elongate tubular adapter sleeve including means for mounting the adapter sleeve on a fixed surface witnin the driver's compartment of a vehicle, the adapter sleeve including at least one annular, radial sleeve flange extending inward from the side walls of the adapter sleeve forming a reduction in the inner diameter of the adapter sleeve to a first preselected size;
    an elongate steering column slidably retained wtihin the adapter sleeve with the longitudinal axis of the adapter sleeve and steering column generally parallel to each other, the steering column having a relatively uniform outer diameter slightly smaller than the first preselected size, and at least one annular radial column flange extending outward from the side walls of the column, the diameter of the flange being slightly smaller than the inner diameter of the adapter sleeve; and
    resilient plastic foam molded to fill the cavity defined by the sleeve flange, the sidewalls of the adapter sleeve, the column flange, and the outer surface of the column;
    whereby, the energy of axial impact loads is absorbed by the elastic deformation of the plastic foam during axial displacement of the steering column relative to the adapter sleeve.

2. The energy absorbing steering assembly of claim 1 wherein the steering column includes an annular, radial breakaway flange extending outward from the steering column, the diameter of the breakaway flange being greater than the inner diameter of the adapter sleeve, the breakaway flange being located at a preselected distance "A" from the end of the adapter sleeve when the adapter sleeve and steering column are in their normal, unstressed condition,
    whereby axial impact forces in the direction from the breakaway flange towards the adapter sleeve greater than the forces necessary to elastically deform the plastic foam and displace the steering column relative to the adapter sleeve by the distance "A" will be transmitted by contact of the breakaway flange with the end of the adapter sleeve, transmitting the excess axial impact forces to the mounting means.

3. The energy absorbing steering assembly of claim 2 wherein the column flanges are located an axial distance at least $A/\epsilon$ from the nearest adapter sleeve flange in the direction of the breakaway flange when the adapter sleeve and steering column are in their unstressed positions, and where $\epsilon$ is less than or equal to the compression strain limit of the plastic foam.

4. The energy absorbing steering assembly of claim 2 wherein all sleeve flanges are located an axial distance of at least $A/\sigma$ from the nearest steering column flange in the direction away from the breakaway flange when the adapter sleeve and steering column are in their unstressed positions; and where $\sigma$ is greater than or equal to the tension strain limit of the plastic foam.

5. The energy absorbing steering assembly of claim 1 wherein the steering column comprises an elongate, tubular housing and an elongate steering shaft mounted co-axially within the housing for rotation relative to the housing and fixedly secured against axial movement relative to the housing.

6. The energy absorbing steering assembly of claim 1 wherein the adapter sleeve includes two sleeve flanges and the steering column includes one column flange located between the sleeve flanges.

7. The energy absorbing steering assembly of claim 1 wherein the steering column includes two column flanges and the adapter sleeve includes one sleeve flange located between column flanges.

8. The energy absorbing steering assembly of claim 1 wherein the adapter sleeve includes two sleeve flanges and the steering column includes first and second column flanges, the first column flange being located between the two sleeve flanges and the second column flange being located on the opposite side of the sleeve flange nearest the steering wheel end of the steering column as the first column flange, thereby dividing the plastic foam between the adapter sleeve and the steering column into three sections, two of which are compressed and one of which is expanded whenever axial impact forces cause the end of the steering column having the steering wheel to move towards the adapter sleeve.

9. The energy absorbing steering assembly of claim 1 wherein the plastic foam is molded in situ to fill the cavity defined by the sleeve flange, the sidewalls of the sleeve, the column flange, and the outer surface of the column.

10. The energy absorbing steering assembly of claim 1 wherein the plastic foam is self skinning.

11. The energy absorbing steering assembly of claim 1 wherein the plastic foam is polyurethane.

12. The energy absorbing steering assembly of claim 1 wherein the adapter sleeve includes first, second and third sleeve flanges and the steering column includes first, second and third column flanges, the first sleeve flange being located between the first and second column flanges at the end of the steering column opposite the end having the steering wheel, the second column flange being located between the second and third sleeve flanges, and the third column flange being located on the opposite side of the third sleeve flange nearest the steering wheel end of the steering column as the second column flange, thereby dividing the plastic foam between the adapter sleeve and the steering column into five sections, three of which are compressed and two of which are expanded whenever axial impact forces cause the end of the steering column having the steering wheel to move towards the adapter sleeve.

13. An energy absorbing steering assembly comprising:
    an elongate tubular adapter sleeve including means for mounting the adapter sleeve on a fixed surface within the driver's compartment of a vehicle, the adapter sleeve including at least one annular, radial sleeve flange extending inward from the side walls of the adapter sleeve forming a reduction in the inner diameter of the adapter sleeve to a first preselected size;
    an elongate steering column slidably retained within the adapter sleeve with the longitudinal axis of the adapter sleeve and steering column generally parallel to each other, the steering column having a relatively uniform outer diameter slightly smaller than the first preselected size, and at least one annular radial column flange extending outward from the side walls of the column, the diameter of the flange being slightly smaller than the inner diameter of the adapter sleeve;
    resilient plastic foam molded to fill the cavity defined by the sleeve flange, the sidewalls of the adapter sleeve, the column flange, and the outer surface of the column; and
    an annular, radial breakaway flange extending outward from the steering column, the diameter of the breakaway flange being greater than the inner diameter of the adapter sleeve, the breakaway flange being located at a preselected distance "A" from the end of the adapter sleeve when the adapter sleeve and steering column are in their normal, unstressed condition;
    whereby, the energy of axial impact loads is absorbed by the elastic deformation of the plastic foam during axial displacement of the steering column relative to the adapter sleeve.

14. An energy absorbing steering assembly comprising:
    an elongate tubular adapter sleeve including means for mounting the adaptor sleeve on a fixed surface within the driver's compartment of the vehicle, the adapter sleeve including a plurality of annular, radial sleeve flanges, each radial sleeve flange extending inward from the side walls of the adapter sleeve forming a reduction in the inner diameter of the adapter sleeve to a first preselected size;
    an elongate steering column slidably retained within the adapter sleeve with the longitudinal axis of the adapter sleeve and steering column generally parallel to each other, the steering column having a relatively uniform outer diameter slightly smaller than the first preselected size, and a plurality of annular radial column flanges (interleaved with the sleeve flanges along the longitudinal axis of the steering column); each radial column flange extending outward from the sidewalls of the column, the diameter of each of the flanges being slightly smaller than the inner diameter of the adapter sleeve;
    resilient plastic foam molded to fill the cavities defined by the sleeve flanges, the sidewalls of the adapter sleeve, the adjacent column flanges, and the outer surface of the column, thereby forming a plurality of energy absorbing cells.
    whereby, a portion of the energy of axial impact loads is absorbed by the elastic deformation of the plastic foam, in overcoming compression and sheer forces in cells which are compressed, and in overcoming tension and sheer forces in cells which are expanded during axial displacement of the steering column relative to the adapter sleeve.

* * * * *